Dec. 18, 1934.   W. I. STIMPSON   1,984,773
BOBBIN DRIVING MEANS
Filed Sept. 17, 1934
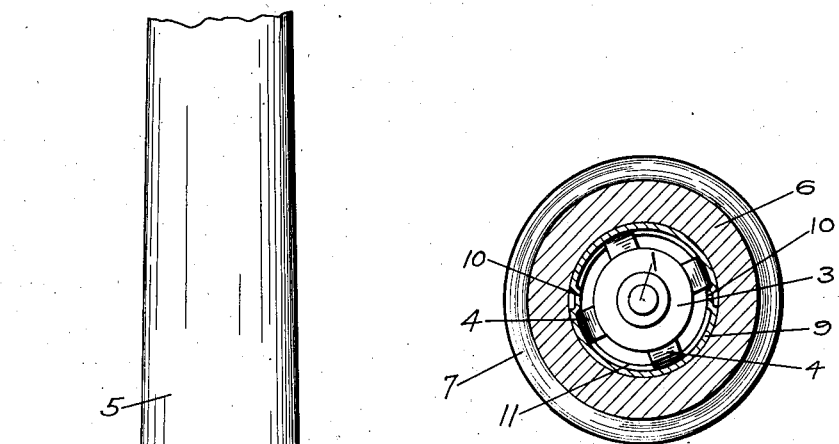
Fig. 2.
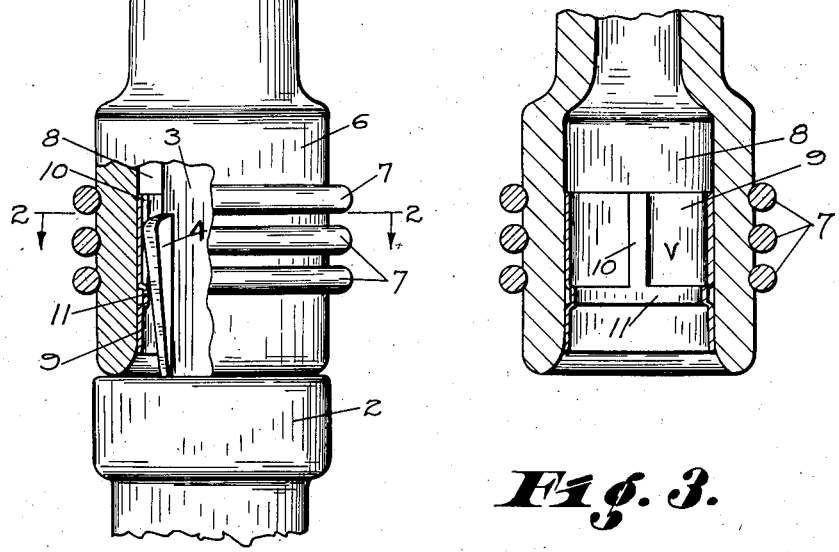
Fig. 3.
Fig. 1.
WITNESS.
CLINTON J. COBURN.
INVENTOR.
WALLACE I. STIMPSON.
BY Claude A. Snider
ATTORNEY.

Patented Dec. 18, 1934

1,984,773

UNITED STATES PATENT OFFICE 1,984,773

BOBBIN DRIVING MEANS

Wallace I. Stimpson, Hopedale, Mass., assignor to Draper Corporation, Hopedale, Mass., a corporation of Maine Application September 17, 1934, Serial No. 744,369

3 Claims. (Cl. 242—46.5)

The present invention pertains to bobbins and spindles, and has more particular reference to the driving connections between the same.

Spindles of the type involved are customarily provided with a centrifugal clutch comprised of a plurality of clutch segments which incline upwardly and outwardly away from the axis of the spindle. The clutch is housed in a bore in the butt of the bobbin and the clutch segments frictionally engage a metal bushing which lines the bore in the bobbin. In prior constructions the frictional engagement between the clutch segments and the bobbin was the sole means by which the bobbin was driven. It is found that under some circumstances, as where the drag of the yarn on the bobbin is unusually heavy, the maximum friction obtainable is insufficient to drive the bobbin at the same speed as the spindle, and the resulting slippage causes serious defects in the yarn package.

It has been proposed to overcome slippage between the centrifugal clutch and the bobbin by providing a positive driving connection between the two. However, insofar as I am aware, no means heretofore devised for such purpose has proven to be satisfactory. It is noted particularly that a prior proposal to provide a positive driving connection by means of slots in the bushing in the butt of the bobbin provides an effective positive driving connection when the spindle clutch segments become seated in the slots, but the slots so weaken the bushing as to render it incapable of properly supporting the butt of the bobbin.

Accordingly, it is the object of the present invention to provide a bobbin and centrifugal clutch spindle wherein the bobbin is provided with a rigid, strong bushing which, in turn, is provided with means cooperating with the segments of the centrifugal clutch to provide a positive driving connection.

The aforesaid object of the invention is accomplished by providing the metal bushing with a rib, or ribs, which projects inwardly from the inner periphery of the bushing and extends axially thereof in position to be engaged by the clutch segments. The rib may be, and in the present embodiment is, formed by merely rolling or grooving the bushing before it is inserted in the bobbin. Such a rib does not weaken the bushing, but actually materially strengthens it. Furthermore, the ribbed bushing provides a bearing surface for all of the clutch segments and permits all of them to participate in the centering of the bobbin on the spindle.

The number of ribs provided is not vital, but where the clutch has four clutch segments I prefer to provide two ribs which are diametrically opposed, to maintain dynamic balance of the bushing.

The preferred embodiment of the invention is illustrated on the accompanying drawing, of which:

Fig. 1 is a fragmentary elevation of the bobbin in position on the spindle;

Fig. 2 is a horizontal cross-section, taken approximately on line 2—2 of Fig. 1; and Fig. 3 is a sectional elevation of the bobbin butt, the spindle being omitted.

The spindle employed with the present embodiment of the invention is but fragmentarily illustrated on the drawing. The same includes a spindle blade 1, a solid portion 2 forced onto the spindle blade, a clutch housing 3 and a centrifugal clutch including clutch segments 4, 4. The clutch segments are symmetrically disposed about the axis of the spindle and incline upwardly and outwardly away from such axis in the conventional manner.

The spindle, per se, is not of the present invention, the same being disclosed and claimed in my prior Patent 1,796,770, granted March 17, 1931, to which patent reference may be had for a more complete disclosure of the spindle.

The bobbin shown includes a barrel portion 5 upon which the yarn (not shown) is to be wound, and an enlarged butt portion 6 provided with the usual split steel rings 7, 7. A cylindrical bore 8 in the butt of the bobbin receives and houses the spindle clutch. A metal bushing 9 is firmly secured in the bore 8, preferably by being spurred to the wood of the bobbin as shown on Fig. 3.

The bushing is of sufficient length to extend well above and below the projecting tops of the clutch segments which frictionally engage the internal surface of the bushing for centering and driving the bobbin. The bushing 9, as shown, is provided with two ribs 10, 10 which project inwardly from the internal surface of the bushing. These ribs extend from a point well below the tops of the clutch segments to a point well above the same. Accordingly, a slight slippage of the bobbin, when it is first started rotating, will result in the leading side of two of the clutch segments engaging behind the ribs 10 as shown on the drawing.

Engagement of the clutch segments with the ribs as just described establishes a positive driving connection which effectively prevents further slipping of the bobbin. Furthermore, this result is accomplished by means which materially strengthen the bushing and enable it to better withstand the stresses set up by the steel rings 7. It will be apparent that the number of ribs provided is not vital, but if more than one rib is used they should be so spaced circumferentially as to simultaneously engage the respective clutch segments.

The bushing shown is further provided with an inwardly projecting, circumferentially extending rib 11 which engages beneath the tops of the clutch segments and prevents the bobbin from rising up on the spindle. The ribs 10 extend vertically upwardly from the rib 11 and the latter insures the seating of the bobbin in such position that the ribs 10 will be engaged by the clutch segments.

The ribs 10 and 11 may be formed in any suitable manner, the preferred method being to roll the ribs into a bushing formed of a ductile sheet metal, as brass.

Having disclosed the preferred embodiment of my invention, I claim:

1. The combination of a rotatable spindle having a plurality of clutch segments which incline outwardly and upwardly away from the axis of the spindle, with a bobbin having a cylindrical metal bushing in a bore in the butt thereof, said bushing being provided with an inwardly projectng rib which extends axially of the bushing in position to be engaged by the side of one of said clutch segments to thereby provide a positive driving connection between said spindle and said bobbin.

2. The combination of a rotatable spindle having a plurality of clutch segments which incline outwardly and upwardly away from the axis of the spindle, with a bobbin having a cylindrical metal bushing in a bore in the butt thereof, said bushing having a vertical, inwardly projecting rib rolled therein, said rib engaging the side of one of said clutch segments to thereby provide a positive driving connection between said spindle and said bobbin.

3. The combination of a rotatable spindle having a plurality of clutch segments which incline outwardly and upwardly away from the axis of the spindle, with a bobbin having a metal bushing in a bore in the butt thereof which bushing serves to house said clutch segments, said bushing being provided intermediate its ends with a continuous, inwardly projecting locking ledge of less diameter than the remainder of the bushing, the ledge engaging the inclined segments below the tops therof and locking the bobbin against rising on the spindle, said bushing being also provided with an inwardly projecting rib extending vertically upwardly from said ledge and engaging the side of one of said clutch segments to thereby provide a positive driving connection between said spindle and said bobbin.

WALLACE I. STIMPSON.